United States Patent [19]

Giancaterino et al.

[11] Patent Number: 5,180,962

[45] Date of Patent: Jan. 19, 1993

[54] APPARATUS FOR TEMPERATURE COMPENSATING ONE OR MORE BATTERY CHARGERS

[75] Inventors: James A. Giancaterino, Sheffield Lake; Bruce Walsh, Avon, both of Ohio

[73] Assignee: Reliance Comm/Tec Corporation, Lorain, Ohio

[21] Appl. No.: 553,228

[22] Filed: Jul. 16, 1990

[51] Int. Cl.[5] .............................................. H02J 7/04
[52] U.S. Cl. ........................................ 320/35; 320/22
[58] Field of Search ................... 320/35, 36, 5, 6, 15, 320/22, 23, 24; 324/426, 427, 429, 431, 433

[56] References Cited

U.S. PATENT DOCUMENTS

| | | | |
|---|---|---|---|
| 3,600,661 | 8/1971 | Briggs et al. | 320/35 |
| 3,852,652 | 12/1974 | Jasinski | 320/35 |
| 3,917,990 | 11/1975 | Sherman, Jr. | 320/35 |
| 4,013,934 | 3/1977 | Frye | 320/35 |
| 4,220,908 | 9/1980 | Nicol | 320/35 |
| 4,398,140 | 8/1983 | Morishita | 320/36 |
| 4,667,143 | 5/1987 | Cooper et al. | 320/35 X |
| 4,847,547 | 7/1989 | Eng, Jr. | 320/35 |

Primary Examiner—Steven L. Stephan
Assistant Examiner—Kristine Peckman
Attorney, Agent, or Firm—Fay, Sharpe, Beall, Fagan, Minnich & McKee

[57] ABSTRACT

An apparatus including a circuit which causes the float voltage of one or more battery chargers to change so as to compensate for changes in the ambient temperature of the batteries connected to the chargers. The circuit does not regulate the charge voltage to the battery but rather provides a battery temperature dependent variable voltage drop in the sense load of the charger(s). The circuit includes a thermistor which is used to sense the temperature of the battery. The temperature dependent resistance of the thermistor is used in a resistive divider for a reference voltage. Selection of the values for the divider components allows the battery temperature dependent variable reference voltage to be a linear approximation of the temperature compensation curve of the battery.

18 Claims, 4 Drawing Sheets

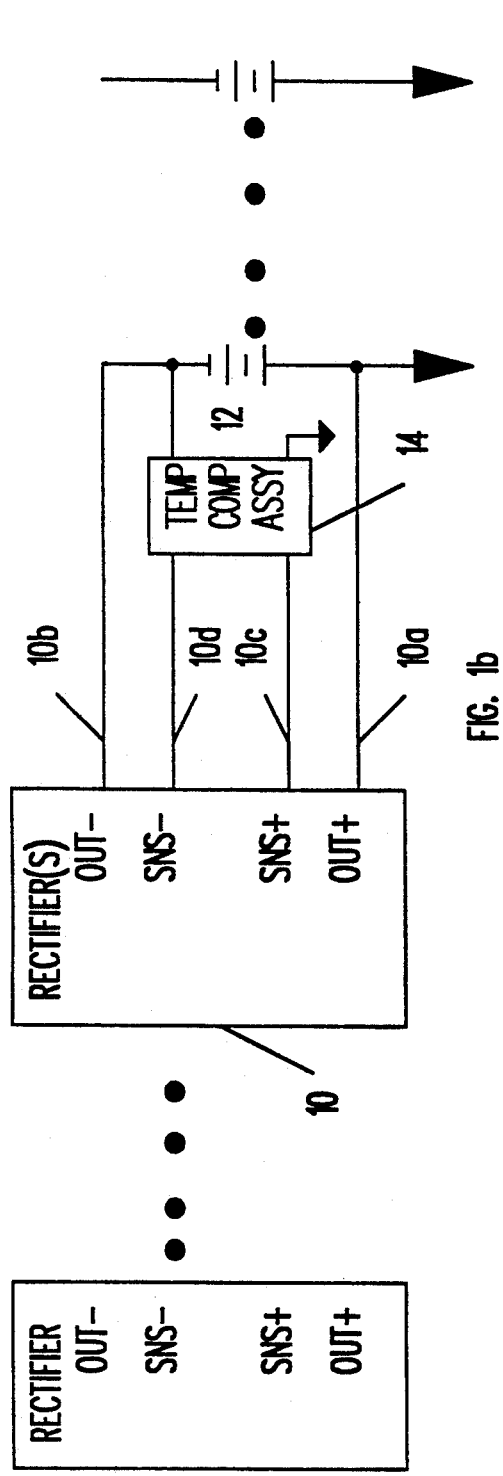
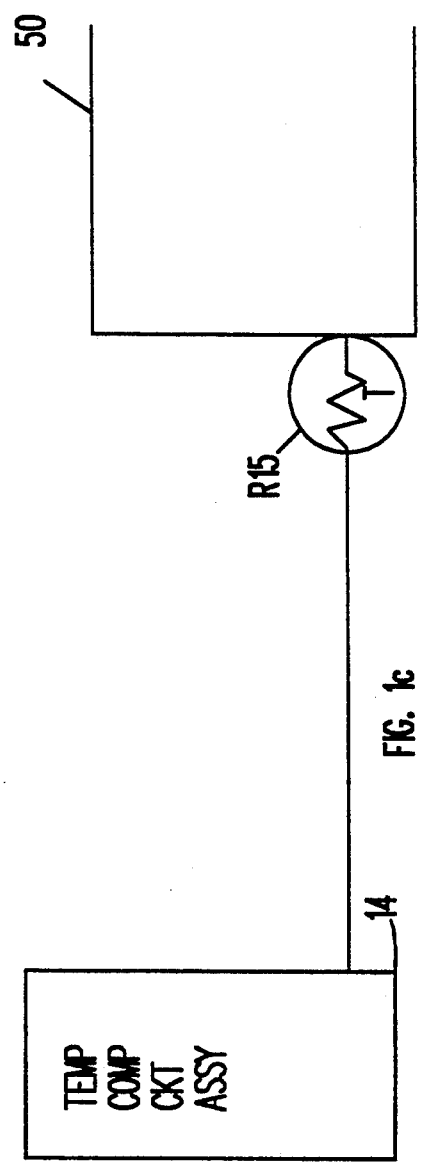
FIG. 1b
FIG. 1c

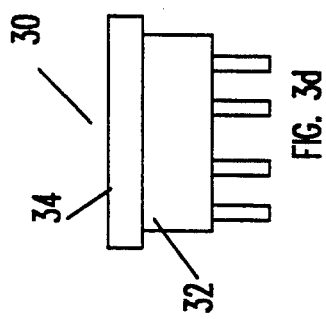
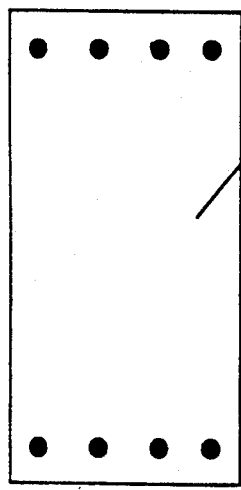
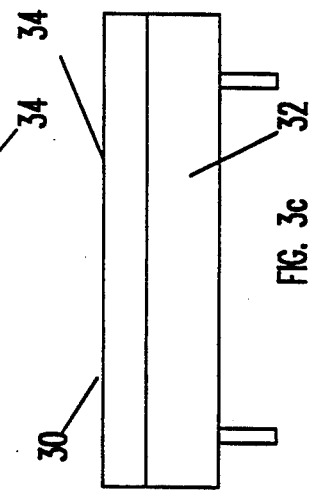
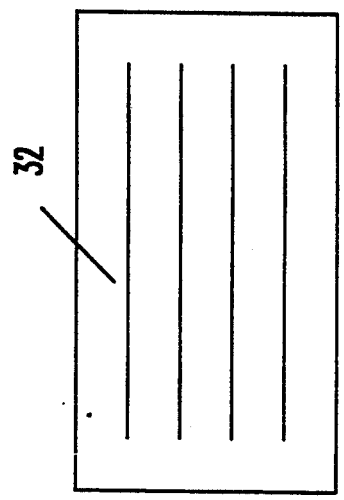
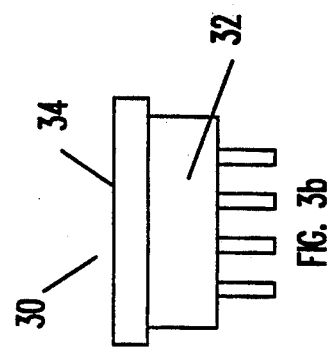

APPARATUS FOR TEMPERATURE COMPENSATING ONE OR MORE BATTERY CHARGERS

BACKGROUND OF THE INVENTION

1. Field of the Invention

This invention relates to battery chargers and more particularly to an apparatus which causes the float voltage of one or more chargers to change so as to compensate for changes in battery ambient temperature.

2. DESCRIPTION OF PRIOR ART

Battery chargers, also known as rectifiers, are used by telephone operating companies to charge and maintain the charge on the batteries used by those companies. Once the battery is charged, the charge is maintained by the float voltage of the charger.

When batteries are exposed to wide variations in ambient temperature their life will be shortened unless the float voltage of the charger changes with the variation in ambient temperature. In other words, it is necessary to compensate for variations in ambient temperature by changing the float voltage so as to maximize battery life.

In the past this change in float voltage was accomplished either through a circuit internal to the charger which would provide the compensation based on the internal temperature of the charger or by a sensor extended outside of the charger. In either of the above arrangements each charger has its own compensation circuit. This may lead to problems where two or more chargers are connected to share the same load. With each charger having its own temperature compensation circuit, the chargers could drift apart which would be contrary to the desired load sharing.

It is desirable then to have a temperature compensation apparatus which can easily be included in chargers without redesigning the charger circuitry. It is further desirable that one temperature compensation apparatus be capable of controlling one or more chargers so that the chargers can, when they are connected to share a load, maintain that load sharing with changes in temperature. The apparatus of the present invention meets these requirements.

SUMMARY OF THE INVENTION

An apparatus for causing the float voltage of one or more battery chargers to change so as to compensate for changes in the ambient temperature of one or more batteries connected to the one or more chargers is provided. Each of the batteries has the same temperature compensation curve. The apparatus is connected between the sense terminals of the one or more chargers and the terminals of the one or more batteries.

The apparatus comprises a circuit and the circuit includes an element whose impedance changes with changes in ambient temperature. The ambient temperature of the element is essentially the same as the ambient temperature of the one or more batteries. The circuit also includes an element having a constant impedance. The constant impedance element and the element whose impedance changes with ambient temperature form a voltage divider for providing from a fixed reference voltage a variable voltage whose amplitude is a linear approximation to the temperature compensation curve of the one or more batteries. The circuit further includes circuitry for providing in response to the variable voltage amplitude a voltage between the one or more chargers sense terminals and the one or more batteries terminals. The amplitude of the voltage is such as to cause the each of the one or more chargers to change its float voltage so as to compensate for the one or more batteries ambient temperature changes.

DESCRIPTION OF THE DRAWING

FIG. 1b is a block diagram of a plurality of chargers interconnected with the temperature compensation circuit of the present invention and a plurality of batteries.

FIG. 1c is a block diagram of the temperature compensation circuit of the present invention with the temperature dependent resistance device of the circuit being shown placed in direct contact with a battery case.

FIGS. 3a to 3e show various views for one embodiment of the housing for the temperature compensation circuit.

DESCRIPTION OF THE PREFERRED EMBODIMENT

Figure 1A:
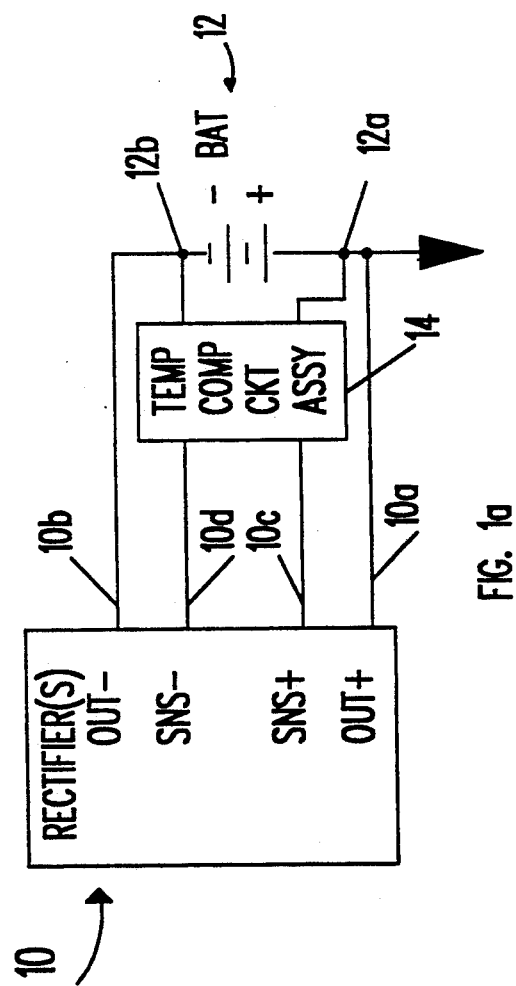
FIG. 1a is a block diagram of a charger which interconnected with the temperature compensation circuit of the present invention.

Referring now to FIG. 1a there is shown a block diagram of a charger 10 which is connected to a battery 12 for the purpose of charging and maintaining the charge on the battery. Charger 10 may be embodied in any one of a number of configurations well known to those skilled in the art. The only requirement is that the charger be of the type which senses the voltage at the battery 12 in order to provide a regulated voltage at the charger outputs 10a and 10b. For the purpose of sensing the battery voltage, charger 10 includes plus and minus sense terminals 10c and 10d, respectively which are connected by leads to the positive and negative battery terminals 12a and 12b, respectively. The temperature compensation circuit 14 of the present invention is connected between the sense terminals 10c and 10d and the battery's positive and negative terminals 12a and 12b.

Circuit 14 provides a voltage drop between terminals 12b and 10d which is a function of battery ambient temperature. The voltage at terminals 10c and 10d is used by the control circuit of the charger as the indication of whether or not the charger output voltage at terminals 10a and 10b should be changed. Therefore, the voltage drop provided by circuit 14 causes the charger to alter its output voltage by the amount of the voltage drop. Thus, as the temperature sensed by circuit 14 from battery 12 changes, the voltage drop of circuit 14 will change thereby changing the output voltage, i.e. battery charging or float voltage, of charger 10. The above discussed operation also occurs when the circuit 14 controls and is interconnected with a plurality of battery chargers (10, 10′) and batteries (12, 12′) as shown in FIG. 1B.

Figure 2:
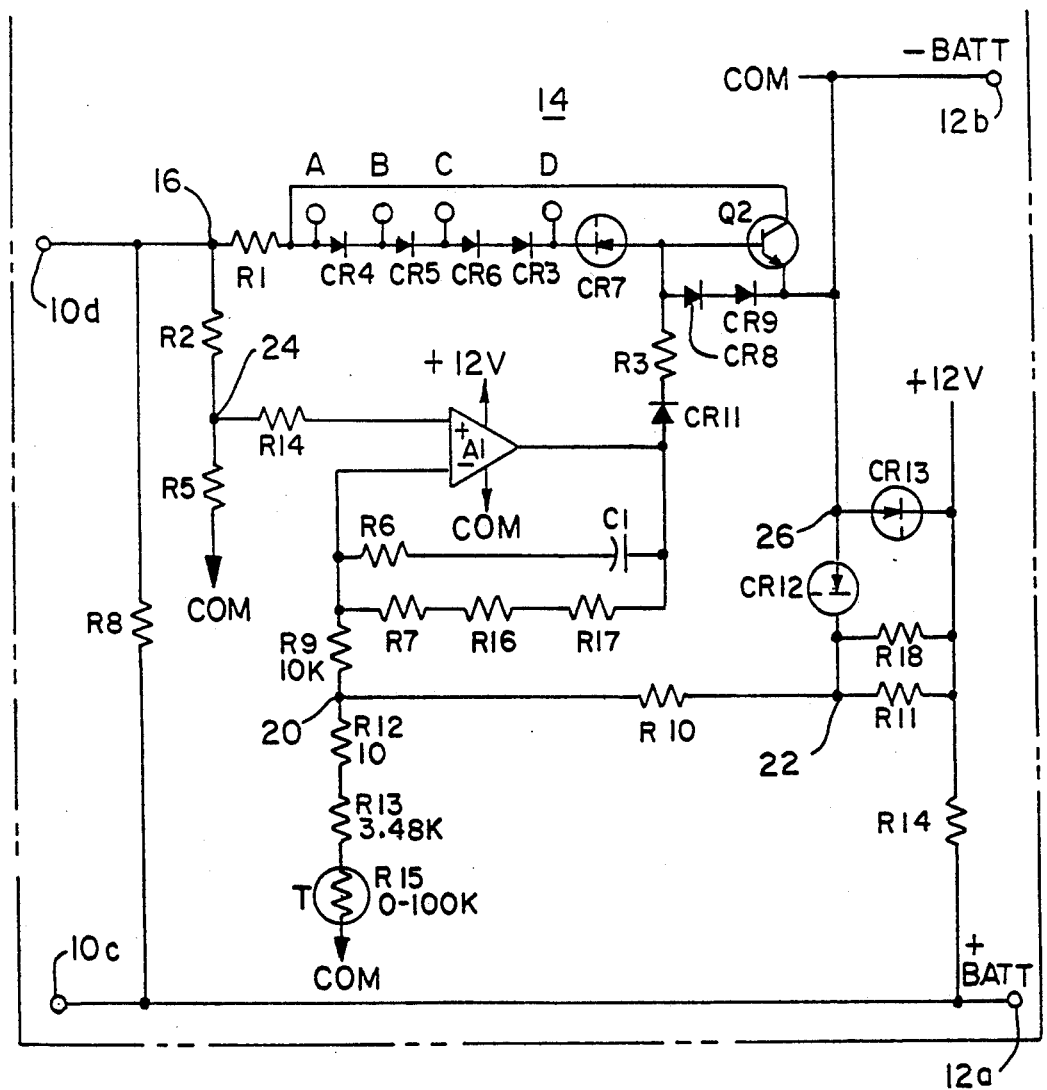
FIG. 2 is a schematic diagram for one embodiment of the temperature compensation circuit.

Referring now to FIG. 2 there is shown a schematic diagram for one embodiment of circuit 14. A transistor Q2 has its base connected by the series connection of diodes CR3, CR4, CR5, CR6, CR7 and resistor R1 to sense terminal 10d. The series connection of the diodes acts as a maximum voltage clamp. Strapping points A, B and C are to the left of the anodes of diodes CR4, CR5 and CR6, respectively, and strapping point D is to the left of the cathode of diode CR7. The load connected to the batteries may be able to tolerate only a predetermined maximum voltage, e.g. 58 volts for a battery whose nominal voltage is 48 volts. Appropriate connection of the strapping points will inhibit transistor Q2 from supporting more than the set voltage.

Transistor Q2 has its collector connected to junction 16 by resistor R1 and its emitter directly connected to the negative terminal 12b of the battery and to the positive terminal 12a as shown. The base and emitter of transistor Q2 are connected to each other by diodes CR8 and CR9. These diodes provide protection in the event that the base to emitter junction of the transistor opens. If that occurs they clamp the output voltage of the charger to 0.7 volts higher than the maximum voltage clamp set by connection of the strapping points.

Circuit 14 acts to regulate the voltage drop across transistor Q2. Circuit 14 does not regulate the voltage to the battery 12. In this manner circuit 14 does not interfere with the voltage control loop of the charger and therefore circuit 14 has only minimal effect on the stability of the charger.

Circuit 14 includes temperature variable thermistor R15 one end of which is connected to circuit common and the other end of which is connected by the series combination of resistors R12 and R13 to junction 20. A resistor R10 connects junction 20 to junction 22 which is connected by the parallel combinations of resistors R11 and R18 and resistor R14 to the positive battery terminal 12a and by diode CR12 to the negative battery terminal 12b. Diode CR12 functions as a reference zener diode whose voltage is divided by resistors R10, R12, R13 and the temperature dependent resistance of thermistor R15. The divided variable, i.e. temperature dependent, reference voltage provided at junction 20 is fed to the inverting input of control amplifier A1. Thermistor R15 is used to sense the temperature of the battery and thereby cause the variable reference voltage provided at junction 20 to have an amplitude representative of battery temperature.

In order that thermistor R15 sense the temperature of the battery, the thermistor is glued through an insulator to the aluminum baseplate of the housing for circuit 14. This causes the thermistor to assume the temperature of the baseplate. The housing of circuit 14 typically includes a plastic case 50 to which the baseplate is attached by any one of a number of well known means. Various views of one embodiment for the housing 30 of circuit 14 showing plastic case 32 and the baseplate 34 are shown in FIGS. 3a to 3e.

The baseplate may either be mounted to the battery case or placed in close proximity thereto so that the baseplate can accurately sense the battery temperature. The mounting of the baseplate to the battery case may be accomplished by the use of any suitable means such as taping the housing of circuit 14 to the battery case with the baseplate abutting the case. It should be appreciated that a telephone company central office typically includes a large number of batteries. Therefore, placing the baseplate in close proximity to a battery case ensures that the temperature of the baseplate will essentially be the same as the temperature of the battery.

The gluing of the thermistor to the baseplate as described above ensures that the thermistor temperature will be the same as the baseplate temperature. Therefore, thermistor R15 senses the battery temperature through the baseplate. While possibly not as desirable, thermistor R15 can also sense the ambient temperature of the battery by itself being either directly mounted to the battery case or placed in close proximity thereto as shown in FIG. 1c.

Circuit 14 senses the voltage across transistor Q2. That voltage is divided by resistors R2 and R5 and applied to the non-inverting input of control amplifier A1 by resistor R4. The divided voltage is compared to the temperature variable reference voltage provided by thermistor R15 at amplifier A1. The resistance of resistors R10, R12, and R13 and thermistor R15 are selected so that the change in the variable reference voltage is a linear approximation of the temperature compensation curve of the battery. For a 48 volt battery the compensation curve is approximately 80 to 100 millivolts per degree centigrade.

Junction 20 is connected by resistor R9 to the inverting input of control amplifier A1. The noninverting input of the amplifier is connected by resistor R4 to junction 24 between resistors R2 and R5. Resistor R5 connects junction 24 to circuit common while resistor R2 connects junction 24 to junction 16. It is the output of control amplifier A1 which drives transistor Q2 to create the appropriate voltage drop between the battery and the lead connected to the negative sense terminal 10d.

Diode CR13 is the power supply zener diode. It establishes the 12 volt bias voltage for amplifier A1 and the reference zener diode CR12.

In one embodiment for circuit 14 in which battery 12 had a nominal voltage of 48 volts, the following component values were chosen for resistors R10, R12 and R13 and thermistor R15:

R10 = 13.3 Kohms
R12 = 10 ohms
R13 = 3.48 Kohms
R15 = 0-100 Kohms depending on temperature and has a resistance of 10 Kohms at 25° C. (77° F.).

It should be appreciated that the above component values for resistors R10, R12 and R13 and thermistor R15 were chosen so as to provide a change in the variable reference voltage which is a linear approximation to the temperature compensation curve of the 48 volt battery. Changing these component values would allow for a linear approximation of the battery compensation curve when the battery is other than a 48 volt battery, e.g. a battery having a nominal voltage of 24 volts.

As described above, circuit 14 provides a voltage drop between the sense terminals of the charger and the terminals of the battery which is a function of battery ambient temperature. The charger changes its output voltage, i.e. the battery float voltage, in response to the voltage at the sense terminals. In the absence of circuit 14, the voltage at the sense terminals is the battery voltage. Therefore the voltage drop provided by circuit 14 must be taken into account when the circuit is first inserted between the sense terminals and the battery.

To take into account the voltage drop provided by circuit 14, the circuit is inserted between the sense and battery terminals. At room ambient temperature a fully charged 48 volt battery has an actual voltage of 54.4 volts. That voltage is applied to the battery terminals and the voltage at the sense terminals of the charger is measured. It should be clear from the above discussion that the voltage at the sense terminals should be lower than 54.4 volts by the voltage drop provided by circuit 14. The measured sense voltage is then permanently placed on the housing for circuit 14 by any one of a number of well known means.

A subsequent user of circuit 14 upon first inserting the circuit between the charger and the battery would then adjust the charger so that the voltage at the sense terminals at room ambient temperature with 54.4 volts on the battery terminals would be the voltage marked on the circuit. Chargers include an accessible means for adjusting the output voltage. The user would adjust that means, which may be a potentiometer, so that the sense voltage at room ambient temperature is the same as that marked on circuit 14.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. An apparatus for causing a float voltage of one or more battery chargers to change so as to compensate for changes in temperature of one or more batteries connected to said one or more chargers, each of said one or more batteries having similar temperature compensation curves, said apparatus connected between sense terminals of said one or more chargers and battery terminals of said one or more batteries, said apparatus comprising:
   a) a circuit comprising:
      i) means having an impedance which changes with changes in ambient temperature, said means having an ambient temperature which is essentially the same as said ambient temperature of said one or more batteries;
      ii) means having a constant impedance, said constant impedance means and said ambient temperature impedance changing means forming a voltage divider for providing from a fixed reference voltage a variable voltage whose amplitude is a linear approximation to temperature compensation curves of said one or more batteries; and
      iii) means responsive to said amplitude of said variable voltage for providing between said sense terminals and said battery terminals a voltage whose amplitude causes each of said one or more chargers to change to float voltage to compensate for ambient temperature changes of said one or more batteries and,
   b) a housing comprising:
      i) a case, said circuit residing in said case; and
      ii) a conductive baseplate attached to said case, said baseplate at essentially said ambient temperature of said one or more batteries, said ambient temperature impedance changing means essentially assuming the ambient temperature of said baseplate.

2. The apparatus of claim 1 wherein said housing baseplate is in close proximity to said one or more batteries.

3. The apparatus of claim 1 wherein each of said one or more batteries has a case and said housing baseplate is mounted on the case of one of said one or more batteries.

4. The apparatus of claim 3 wherein said circuit ambient temperature impedance changing means is a thermistor.

5. An apparatus for causing a float voltage of one or more battery chargers to change so as to compensate for changes in temperature of one or more batteries connected to said one or more battery chargers, each of said one or more batteries having similar temperature compensation curves, said apparatus connected between sense terminals of said one or more battery chargers and battery terminals of said one or more batteries, said apparatus comprising:
   a) a housing comprising:
      i) a case, said circuit residing in said case; and
      ii) a conductive baseplate attached to said case, said baseplate at essentially said ambient temperature of said one or more batteries;
   b) a circuit inside said housing, said circuit comprising:
      i) means having an impedance which changes with changes in ambient temperature, said ambient temperature impedance changing means essentially assuming the ambient temperature of said baseplate;
      ii) means having a constant impedance, said constant impedance means and said ambient temperature impedance changing means forming a voltage divider for providing from a fixed reference voltage a variable voltage whose amplitude is a linear approximation to said one or more batteries temperature compensation curve; and
      iii) means responsive to said amplitude of said variable voltage for providing between said sense terminals and said battery terminals a voltage whose amplitude is such as to cause each of said one or more chargers to change its float voltage so as to compensate for ambient temperature changes of said one or more batteries.

6. The apparatus of claim 5 wherein each of said one or more batteries has a case and said housing baseplate is mounted on the case of one of said one or more batteries.

7. The apparatus of claim 6 wherein said circuit ambient temperature impedance changing means is a thermistor.

8. The apparatus of claim 5 wherein said housing baseplate is in close proximity to said one or more batteries.

9. The apparatus of claim 5 wherein said circuit ambient temperature impedance changing means is a thermistor.

10. The apparatus of claim 8 wherein said circuit ambient temperature impedance changing means is a thermistor.

11. A battery charging system comprising:
   one or more batteries each having a negative battery terminal and a positive battery terminal, each battery having equivalent temperature compensation curves;
   one or more battery chargers each having negative and positive charger terminals, and negative and positive sense terminals, at least one of said negative charger terminals connected to at least one of said negative battery terminals and at least one of said positive charger terminals connected to at least one of said positive battery terminals; and
   a temperature compensation apparatus including,
      detecting terminals connected to said negative and positive battery terminals of each of said one or more batteries, for detecting a battery voltage existing at said one or more batteries,
      a developing means, for developing a temperature compensated variable voltage, independent of impedance existing in said one or more battery chargers and said one or more batteries, and impressing terminals connected to said negative and positive sense terminals of each of said one or more battery chargers, for impressing said temperature compensated variable voltage to said sense terminals, wherein s plurality of battery chargers are connected to said temperature compensation apparatus to control one of the one or more batteries.

12. The system of claim 11 wherein said temperature compensation circuit further includes;
   i) means having an impedance which changes with changes in ambient temperature, said means having an ambient temperature which is essentially the same as said ambient temperature of said one or more batteries, and
   ii) means having a constant impedance, said constant impedance means and said ambient temperature impedance changing means forming a voltage divider for providing from a fixed reference voltage a variable reference voltage whose amplitude is a linear approximation to said one or more batteries temperature compensation curves,
   wherein said developing means is responsive to an amplitude of said variable reference voltage so as to provide said temperature compensated variable voltage to said impressing means such as to cause each of said one or more battery chargers to change its voltage output so as to compensate for ambient temperature changes of said one or more batteries.

13. A battery charging system comprising:
   one or more batteries each having a negative battery terminal and a positive battery terminal, each battery having equivalent temperature compensation curves;
   one or more battery chargers each having negative and positive charger terminals, and negative and positive sense terminals, at least one of said negative charger terminals connected to at least one of said negative battery terminals and at least one of said positive charger terminals connected to at least one of said positive battery terminals; and
   a temperature compensation apparatus including,
      detecting terminals connected to said negative and positive battery terminals of each of said one or more batteries, for detecting a battery voltage existing at said one or more batteries,
      a developing means, for developing a temperature compensated variable voltage, independent of impedance existing in said one or more battery chargers and said one or more batteries, and
      impressing terminals connected to said negative and positive sense terminals of each of said one or more battery chargers, for impressing said temperature compensated variable voltage to said sense terminals,
   wherein a plurality of batteries are connected to said temperature compensation apparatus to be controlled by one of the one or more battery chargers.

14. The battery charging system of claim 13 wherein a voltage divider provides a variable reference voltage from a fixed reference voltage.

15. The battery charging system of claim 14 wherein the developing means of the temperature compensation circuit further includes a comparing means for comparing an amplitude of the variable reference voltage and an amplitude of a voltage representative of said battery voltage.

16. The system of claim 13 wherein said temperature compensation circuit further includes;
   i) means having an impedance which charges with changes in ambient temperature, said means having an ambient temperature which is essentially the same as said ambient temperature of said one or more batteries, and
   ii) means having a constant impedance, said constant impedance means and said ambient temperature impedance changing mean forming a voltage divider for providing from a fixed reference voltage a variable reference voltage whose amplitude is a linear approximation to said one or more batteries temperature compensation curves,
   wherein said developing means is responsive to an amplitude of said variable reference voltage so as to provide said temperature compensated variable voltage to said impressing means such as to cause each of said one or more battery chargers to change its voltage output so as to compensate for ambient temperature changes of said one or more batteries.

17. A battery charging system comprising:
   one or more batteries each having a negative battery terminal and a positive battery terminal, each battery having equivalent temperature compensation curves;
   one or more battery chargers each having negative and positive charger terminals, and negative and positive sense terminals, at least one of said negative charger terminals connected to at least one of said negative battery terminals and at least one of said positive charger terminals connected to at least one of said positive battery terminals; and
   a temperature compensation apparatus including,
      detecting terminals connected to said negative and positive battery terminals of each of said one or more batteries, for detecting a battery voltage existing at said one or more batteries,
      a developing means, for developing a temperature compensated variable voltage, independent of impedance existing in said one or more battery chargers and said one or more batteries, and
      impressing terminals connected to said negative and positive sense terminals of each of said one or more battery chargers, for impressing said temperature compensated variable voltage to said sense terminals,
   wherein a plurality of the one or more battery chargers and a plurality of the one or more batteries are connected to said temperature compensation apparatus.

18. The system of claim 17 wherein said temperature compensation circuit further includes;
   i) means having an impedance which changes with changes in ambient temperature, said means having an ambient temperature which is essentially the same as said ambient temperature of said one or more batteries, and
   ii) means having a constant impedance, said constant impedance means and said ambient temperature impedance changing means forming a voltage divider for providing from a fixed reference voltage a variable reference voltage whose amplitude is a linear approximation to said one or more batteries temperature compensation curves, wherein said developing means is responsive to an amplitude of said variable reference voltage so as to provide said temperature compensated variable voltage to said impressing means such as to cause each of said one or more battery chargers to change its voltage output so as to compensate for ambient temperature changes of said one or more batteries.

* * * * *